United States Patent Office 3,507,888
Patented Apr. 21, 1970

3,507,888
PROCESS AND INTERMEDIATES FOR MANUFACTURE OF 17-OXYGENATED ESTR-4-EN-3-ONES
Paul D. Klimstra, Northbrook, Ill., assignor to G. D. Searle & Co., Chicago, Ill., a corporation of Delaware
No Drawing. Filed Aug. 30, 1966, Ser. No. 575,951
Int. Cl. C07c 169/10, 169/12
U.S. Cl. 260—397.3    7 Claims

ABSTRACT OF THE DISCLOSURE

Novel intermediates and novel process involving the selective oximation of the 3-keto group of estr-5(10)-ene-3,17-dione followed by reaction of the 17-oxo group and cleavage of the 3-oximino group to yield the desired 17-oxygenated estr-4-en-3-ones.

---

The present invention is concerned with a novel process and novel intermediates useful in the manufacture of known and useful steroids characterized by a 17-oxygenated estr-4-en-3-one structure. Those novel intermediates are characterized by a 3-oximino or 3-alkoximino group and are represented by the following structural formula

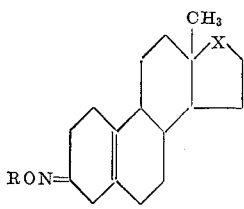

wherein R is hydrogen or a lower alkyl radical and X can be a carbonyl or

radical, Z being hydrogen or a lower aliphatic hydrocarbon radical.

The lower aliphatic hydrocarbon radicals encompassed by Z can be lower alkyl radicals such as methyl, ethyl, propyl, butyl, pentyl, hexyl and heptyl, lower alkenyl radicals such as vinyl, propenyl, butenyl, pentenyl, hexenyl and heptenyl and lower alkynyl radicals such as ethynyl, propynyl, butynyl, pentynyl, hexynyl and heptynyl, together with the branched-chain groups isomeric with those radicals. The lower alkyl radicals encompassed by R are as hereinbefore exemplified.

Methods previously available for the manufacture of 17-oxygenated estr-4-en-3-ones utilize estr-4-ene-3,17-dione as the starting material. The latter substance is obtained by the Birch reduction of estrone or estradiol followed by oxidation of the 17-hydroxy group. Those aromatic steroids, i.e. estrone and estradiol, are obtained by lengthy and costly synthetic processes which culminate in the cumbersome pyrolysis of androsta-1,4-diene-3,17-dione or 17β-hydroxyandrosta-1,4-dien-3-one, thus effecting the desired expulsion of the angular methyl group at carbon atom 10. More recently there have been developed improved methods for the manufacture of steroids lacking the angular 10-methyl group, those processes avoiding the aforementioned cumbersome and costly procedures. The processes described in U.S. Patent 3,176,014, for example, involve elimination of the angular methyl group through the initial formation of a 6β,19-epoxy linkage. When the substituent at carbon atom 10 is removed in later steps, the product formed is estr-5(10)-ene-3,17-dione rather than the corresponding Δ⁴ isomer produced by the aforementioned older methods.

By the present invention it has been surprisingly discovered that the latter readily available diketone, i.e. estr-5(10)-ene-3,17-dione, can be reacted with hydroxylamine or a lower alkoxylamine, preferably in the form of a suitable salt, to selectively form the corresponding 3-oximino or 3-alkoximino derivative. The reaction is conducted at or near room temperature in a suitable water-miscible organic solvent which will provide a homogeneous medium. When salts of hydroxylamine or the alkoxylamine are used, an equivalent quantity of a base is added in order to liberate the free amine. Organic bases such as pyridine are especially preferred. Isolation of the product is conveniently effected by dilution of the reaction mixture with water. The reaction of an ethanol solution of estr-5(10)-ene-3,17-dione with hydroxylamine hydrochloride and pyridine thus affords estr-5(10)-ene-3,17-dione 4-oxime. When methoxylamine hydrochloride is used, the product is estr-5(10)-ene-3,17-dione 3-methoxime.

Introduction of the desired moiety at the 17-position of the latter 3-oxime or 3-alkoximes is readily effected without disturbing either the oxime function or the 5(10) double bond. Reduction of estr-5(10)-ene-3,17-dione 3-oxime, for example, with a metallic reducing agent such as sodium borohydride, lithium aluminum hydride, lithium tri-(tertiary-butoxy) aluminum hydride, diisobutyl aluminum hydride, etc. thus affords 17β-hydroxyestr-5(10)-en-3-one 3-oxime. The 17α-(hydrocarbon-substituted) derivatives are produced by reaction with the appropriate organometallic reagent. Reaction with an alkyl Grignard reagent, for example methyl magnesium bromide, affords 17β - hydroxy - 17α - methylestr-5(10)-en-3-one 3-oxime while the use of lithium acetylide produces 17α-ethynyl-17β-hydroxyestr-5(10)-en-3-one 3-oxime. The 17α-alkenyl derivatives are alternatively produced by partial reduction of the corresponding 17α-alkynyl compounds. 17α-Ethynyl-17β-hydroxyestr-(10)-en-3-one 3-oxime, for example, affords 17β-hydroxy-17α-vinylestr-5(10)-en-3-one 3-oxime when contacted with hydrogen in the presence of 5% palladium-on-carbon catalyst.

The 3-oximino or 3-alkoximino protecting group is readily removed by reaction with dilute acid in a suitable organic solvent medium. Especially preferred acids are hydrochloric, sulfuric, acetic, p-toluenesulfonic and the like. The reaction is accelerated by the addition of a suitable carbonyl compound, e.g. acetone, pyruvic acid. The aforementioned 17β - hydroxyestr - 5(10)-en-3-one 3-oxime, for example, is contacted with aqueous acetic acid and pyruvic acid to produce the desired 17β-hydroxyestr-4-en-3-one. The latter substance is a well-known anabolic agent. The aforementioned 17α-methyl and 17α-ethynyl intermediates, upon cleavage of the 3-oximino or 3-alkoximino group, yield, respectively, 17β-hydroxy-17α-methylestr-4-en-3-one, also a well-known anabolic agent, and 17α - ethynyl - 17β - hydroxyestr - 4 - en-3-one, a known progestational agent.

The invention will appear more fully from the examples which follow. These examples are set forth by way of illustration only and it will be understood that the invention is not be construed as limited thereby either in spirit or in scope as many modifications both in materials and methods will be apparent from this disclosure to those skilled in the art. In these examples, temperatures are given in degrees centigrade (° C.) and quantities of materials in parts by weight unless otherwise noted.

EXAMPLE 1

To a solution of one part of estr-5(10)-ene-3,17-dione in 4 parts of ethanol is added successively with stirring 5 parts of pyridine and 0.28 part of hydroxylamine hydrochloride. The resulting reaction mixture is warmed slightly for several minutes, then is allowed to cool to room temperature and is stored at the latter temperature for about 3½ hours. At the end of that reaction period, the mixture is diluted with water until the persistence of turbidity, then is cooled at 0–5° in order to promote crystallization of the product. Collection of the resulting precipitate by filtration followed by purification of that crude product by recrystallization from aqueous methanol affords pure estr-5(10)-ene-3,17-dione 3-oxime, melting at about 152–155°. This compound is characterized further by infrared absorption maxima, in chloroform, at about 2.75, 3.04, 3.40, 5.75 and 6.00 microns. Its identity is further established by the absence of a nuclear magnetic resonance peak characteristic of a vinyl proton at the 4-position. This compound is represented by the following structural formula

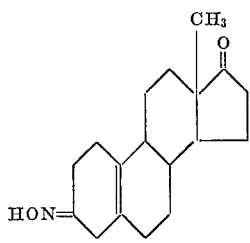

EXAMPLE 2

To a solution of one part of estr-5(10)-ene-3,17-dione 3-oxime in 20 parts of methanol is added a solution of one part of sodium borohydride in 2 parts of water, and that reaction mixture is stirred at room temperature for about 3 hours. Dilution of the mixture with water results in precipitation of the product, which is isolated by filtration, washed on the filter with water and dried in air. Purification by recrystallization from aqueous methanol affords 17β - hydroxyestr - 5(10)-en-3-one 3-oxime, melting at about 110–112°. It displays infrared absorption maxima, in chloroform, at about 2.75, 3.42, and 6.02 microns and is characterized by the following structural formula

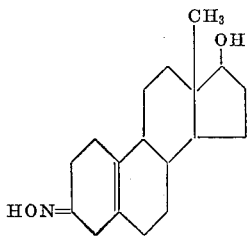

EXAMPLE 3

Method A

A mixture containing 5 parts of 17β-hydroxyestr-5(10)-en-3-one 3-oxime, 12 parts of concentrated hydrochloric acid, 80 parts of methanol and 30 parts of water is heated at the reflux temperature for about 4 hours, then is cooled to room temperature and diluted with water. The resulting precipitate is collected by filtration and dried to yield 17β-hydroxyestr-4-en-3-one, melting at about 122–125°.

Method B

A solution containing 2 parts of 17β-hydroxyestr-5(10)-en-3-one 3-oxime, 42 parts of glacial acetic acid, 7.6 parts of pyruvic acid and 13 parts of water is stored at room temperature for about 24 hours, then is poured carefully into water. The resulting aqueous mixture is extracted with ether, and the organic solution is washed successively with water and 5% aqueous sodium carbonate, then dried over anhydrous sodium sulfate and stripped of solvent under reduced pressure. The oily residue is purified by recrystallization from aqueous methanol to afford 17β-hydroxyestr-4-en-3-one, identical with the product of Method A.

What is claimed is:

1. A compound of the formula

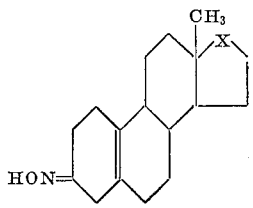

wherein X is selected from the group consisting of carbonyl and β-hydroxymethylene radicals.

2. A process for manufacture of the compound of claim 1 wherein X is a carbonyl radical which comprises contacting estr-5(10)-ene-3,17-dione with hydroxylamine.

3. As in claim 1, the compound which is estr-5(10)-ene-3,17-dione 3-oxime.

4. As in claim 1, the compound which is 17β-hydroxyestr-5(10)-en-3-one 3-oxime.

5. A process for the manufacture of 17β-hydroxyestr-4-en-3-one which comprises contacting estr-5(10)-ene-3,17-dione with hydroxylamine, contacting the resulting estr-5(10)-ene-3,17-dione 3-oxime with a metallic reducing agent and contacting the resulting 17β-hydroxyestr-5(10)-en-3-one 3-oxime with an acidic hydrolyzing agent.

6. The process of claim 5 wherein 17β-hydroxyestr-5(10)-en-3-one 3-oxime is contacted with an acidic hydrolyzing agent in the presence of a suitable carbonyl compound.

7. The process of claim 5 wherein 17β-hydroxyestr-5(10)-en-3-one 3-oxime is contacted with an acidic hydrolyzing agent in the presence of pyruvic acid.

References Cited

UNITED STATES PATENTS

| | | | |
|---|---|---|---|
| 3,299,107 | 1/1967 | Mazur | 260—397.5 |
| 3,318,925 | 5/1967 | Anner et al. | 260—397.4 |
| 3,346,601 | 10/1967 | Wettstein et al. | 260—397.4 |

LEWIS GOTTS, Primary Examiner

E. G. LOVE, Assistant Examiner

U.S. Cl. X.R.

260—397.5, 999